Dec. 1, 1953 P. M. BRISTER 2,661,075
FLUID MIXING AND SEPARATING APPARATUS
Filed Oct. 25, 1950 3 Sheets-Sheet 1

INVENTOR
Paul M. Brister
BY
ATTORNEY

Dec. 1, 1953  P. M. BRISTER  2,661,075
FLUID MIXING AND SEPARATING APPARATUS
Filed Oct. 25, 1950  3 Sheets-Sheet 2
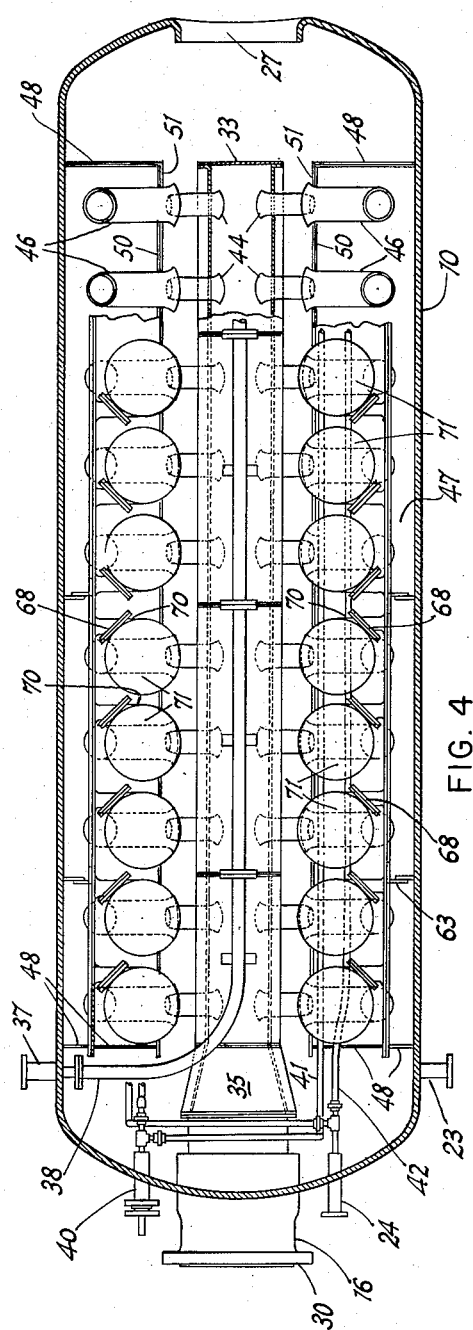
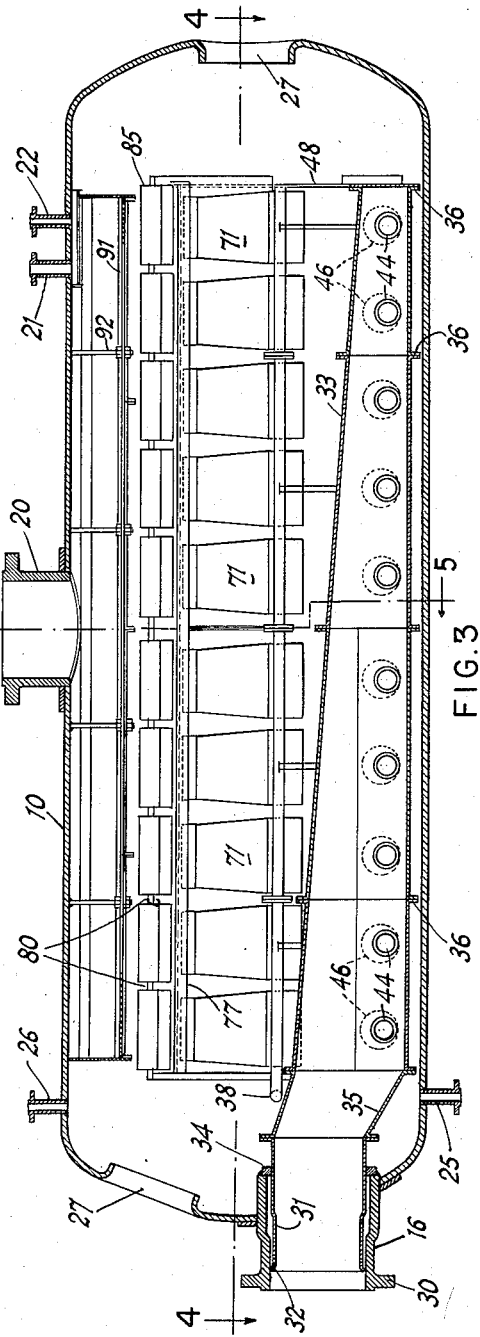
INVENTOR
Paul M. Brister
BY
ATTORNEY Dec. 1, 1953  P. M. BRISTER  2,661,075
FLUID MIXING AND SEPARATING APPARATUS
Filed Oct. 25, 1950  3 Sheets-Sheet 3

INVENTOR
Paul M. Brister
BY
ATTORNEY

Patented Dec. 1, 1953

2,661,075

UNITED STATES PATENT OFFICE 2,661,075

FLUID MIXING AND SEPARATING APPARATUS

Paul M. Brister, Madison, N. J., assignor to The Babcock & Wilcox Company, New York, N. Y., a corporation of New Jersey Application October 25, 1950, Serial No. 192,105

10 Claims. (Cl. 183—22)

The present invention relates to gaseous fluid conditioners, and more particularly to devices wherein liquid and gaseous fluids are intimately mixed with the fluids subsequently separated within the device for the discharge of the gaseous fluid in a substantially liquid free condition.

In accordance with my present invention, I provide a closed pressure vessel having inlet and outlet connections for gaseous and liquid fluids. Within the vessel a body of liquid is maintained with a substantially uniform level, while the gaseous fluid is introduced into the vessel and distributed to a plurality of jet-type eductors. The eductors are submerged beneath the level of the liquid with each eductor nozzle surrounded by an annular opening in communication with the body of liquid maintained within the vessel. The eductor action of the nozzles mixes the gaseous and liquid fluids, with the mixture thereafter passed through closed channels to gas and liquid separating devices, such as whirl chambers. The whirl chambers are provided with upper and lower outlets above and below the liquid level, respectively, so that the separated liquid is returned to the body of fluid maintained in the vessel and the lighter fluid is discharged upwardly from the whirl chambers through deflecting baffles and thence to the outlet from the vessel.

The fluid conditioner of the present invention is particularly useful as a washer for saturated steam, as a desuperheater for superheated steam, or as a washer for a gas. In each case, a pressure drop of the entering gaseous fluid is utilized to mix the gaseous fluid with a liquid, and to separate the fluids to attain the desired washing and/or heat exchange effect.

The various features of novelty which characterize this invention are pointed out with particularity in the claims annexed to and forming a part of this specification. For a better understanding of the invention, its operating advantages and specific objects attained by its use, reference should be had to the accompanying drawings and descriptive matter in which a preferred embodiment of the invention has been illustrated and described.

Of the drawings:

Fig. 3 is a section view of the desuperheater taken in a vertical plane passing through the longitudinal axis of the drum;

Fig. 4 is a section view taken on the line 4—4 of Fig. 3;

Figure 1:
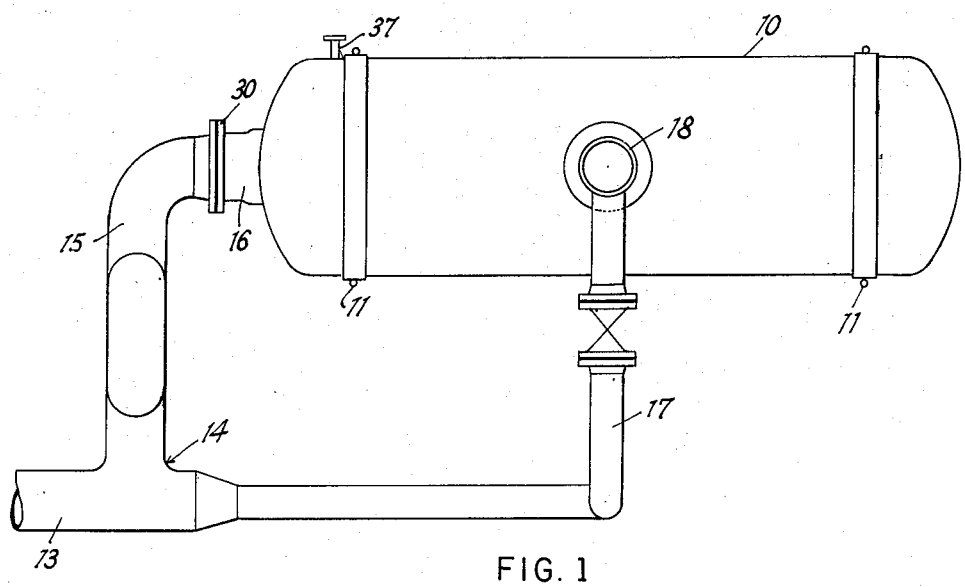
Fig. 1 is a plan view of a steam desuperheater constructed and arranged in accordance with the present invention and showing the external steam connections thereto.

The present invention is illustrated in the drawings in the form of a steam desuperheater. In such a heat transfer application the liquid, which is water, is partially evaporated, thus increasing the solid content of the water retained and recirculated in the desuperheater drum. As hereinafter described, a wide variation in the purity of the desuperheating water will not appreciably affect the purity of the desuperheated steam discharged from the apparatus. This feature is due to the effective separation of higher density liquids and solids from the desuperheated steam within the apparatus. When the apparatus is used as a gas cleaner, the liquid, which may be water or oil, is provided with an external filter or the equivalent, with the liquid continuously recirculated through the pressure vessel and the external filter to maintain the high purity of the liquid.

Figure 2:
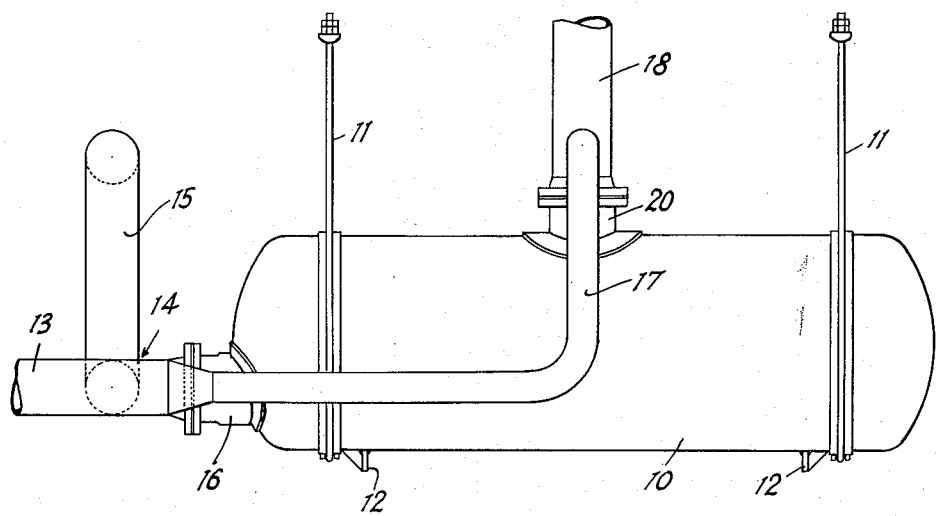
Fig. 2 is an elevation view of the apparatus shown in Fig. 1.

In general, as shown in the drawings, the desuperheater comprises a horizontally elongated drum 10 which is supported by hangers 11 from overhead steelwork and provided with snubbing lugs 12 so that expansion and contraction of the drum can be accommodated without disrupting the steam and water connections thereto. As shown in Figs. 1 and 2, a steam conduit 13 containing superheated steam supplied from any suitable source is provided with a T connection 14. One arm of the T is connected with the feed inlet nozzle 16 of the drum by means of a looped conduit 15 while another arm of the T is provided with a valved steam by-pass conduit 17 connected with a steam outlet conduit 18 from the drum outlet nozzle 20.

As shown in the drawings, the drum 10 is provided with suitable nozzles of conventional type for the installation of a safety valve 21, a steam vent and a pressure gauge 22, a water column 23, continuous blow-down 24, blow-off or drain 25, and a water regulator connection 26, as well as access manholes 27 in the drum heads.

Figure 5:
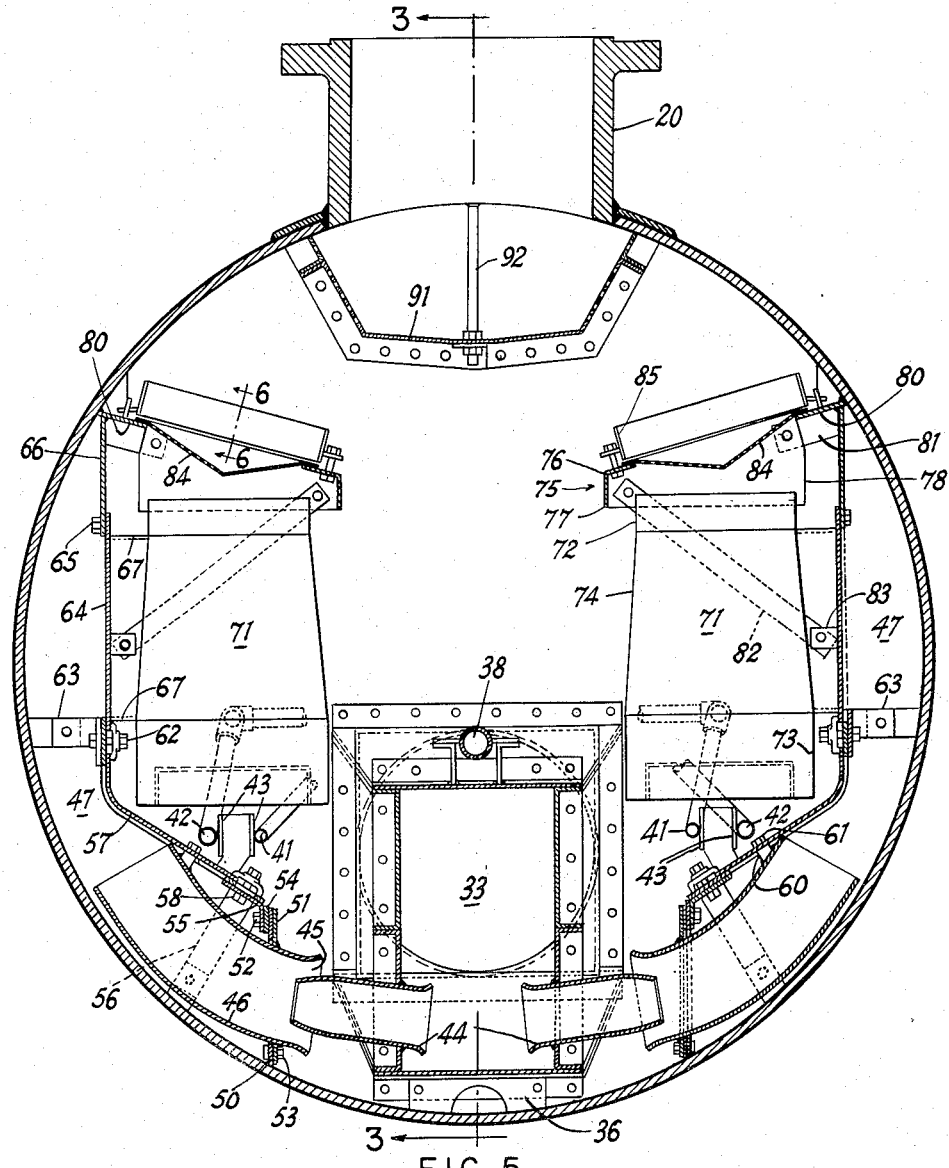
Fig. 5 is an enlarged cross-section view of the apparatus taken on the line 5—5 of Fig. 3.

Referring particularly to Figs. 3, 4 and 5, the steam inlet nozzle 16 is laterally centered and positioned in the lower portion of one of the drum heads. The inlet nozzle is welded into the drum head and provided with an exterior flange 30 for attachment to the conduit 15. Since the incoming steam will be at a higher temperature than the temperature prevailing within the drum, a thermal sleeve 31 is provided in the nozzle to avoid high thermal stresses in the junction of the nozzle and the shell (see Fig. 3). The thermal sleeve is formed of a relatively light weight plate material having a slightly belled end 32 slidingly engaging the interior surface of the steam nozzle 16. The opposite end of the thermal sleeve extends within the drum 10 and is flanged for a connection with a steam distributing duct 33. An annular plate 34 is welded to the interior end of the steam nozzle 16 and is machined for a sliding fit with the exterior surface of the thermal sleeve 31.

The steam distributing duct 33 is provided with a flanged transit on piece 35, which changes in cross-sectional shape from a circular attachment to the flange of the thermal sleeve 31 to a rectangular flanged attachment to the steam distributing duct 33. The transition piece is downwardly inclined with the distributing duct 33 located closely adjacent the bottom surface of the desuperheater drum 10. As shown particularly in Fig. 3, the distributing duct is formed of a plurality of connected sections with the vertical dimension of the duct progressively reduced from the steam inlet end toward the opposite end of the drum, so as to give good steam distribution longitudinally of the drum. The lateral dimension of the duct is substantially uniform throughout its length. As indicated in the drawings, the distributing duct is directly supported on the drum by a series of upstanding transverse plate members 36. The combination of the thermal sleeve and the plate members 36 permits relative longitudinal movement between the duct 33 and the drum 10, as caused by the difference in operating temperatures therebetween.

As hereinafter described the water level in the drum is ordinarily maintained at the horizontal centerline of the drum. Make-up water is supplied to the drum 10 through a feed water inlet nozzle 37 and a distributing pipe 38 which is laterally centered with respect to the drum and extends substantially the full length thereof. The feed water pipe is directly supported upon the steam distributing duct 33 and is provided with a plurality of outlets spaced along the pipe, and opening upwardly therefrom. With the arrangement described, a substantially uniform level of water can be maintained manually within the drum, or automatically, as may be desired. The automatic water level control can be any one of the conventional feed water control devices well known in the art.

It is desirable to chemically treat the water within the desuperheater drum so as to prevent corrosion or excessive scale formation. Accordingly, a chemical feed connection is provided. Since the incoming chemicals will ordinarily be at a considerably lower temperature than the temperature within the drum, the chemical feed nozzle 40 is provided with a thermal sleeve similar in general construction to the thermal sleeve 31 hereinbefore described for the steam inlet nozzle 16. Within the drum, the chemical feed nozzle 40 is connected with a pair of distributing pipes 41. Each pipe extends longitudinally of the drum on opposite sides of the steam distributing duct 33, and each is laterally spaced from the drum substantially as shown in Fig. 5. Each pipe is provided with a series of openings in the top in communication with the interior of the drum 10. The chemical feed pipes are paralleled by blow-down pipes 42 outwardly spaced therefrom and likewise having openings in the top for the admission of drum water thereto. The blow-down pipes are connected with the continuous blow-down nozzle 24 for the discharge of water from the drum. Baffle plates 43 are provided between each chemical feed pipe 41 and the companion laterally spaced blow-down pipe 42 so that a direct movement of incoming chemicals to the blow-down pipe is avoided.

With the introduction of make-up water sufficient to maintain the desired water level within the drum, a continuous or intermittent blow down, and chemical treatment of the water within the drum substantially any water of reasonable quality may be used as a source of liquid supply.

Steam is mixed with the desuperheating water by the use of a plurality of jet nozzles 44 located at longitudinally spaced positions in the lower portion of the steam distributing duct, where these nozzles are surrounded by an annular opening 45 communicating with the body of water maintained within the drum 10. The combination of the jet steam nozzles 44 with the direct connection to the drum water results in an eductor effect whereby steam and water are mixed for heat transfer purposes. As shown in Fig. 5 each jet nozzle is constructed with a progressively reduced cross-sectional area projecting outwardly from the steam distributing duct 33. The annular opening 45 surrounding each jet nozzle 44 is formed by a bell mouthed pipe 46 which overlaps the discharge end of the nozzle and extends upwardly along the curvature of the drum.

Each of the pipes 46 is formed from a curved length of pipe, or tube, and is arranged to discharge a mixture of steam and water into chambers 47 formed along the longitudinal sides of the drum 10. As hereinafter described, both the steam and water separating devices and the pipes 46 are removably supported from the plates defining the chambers 47. The inner walls of the chambers 47 are welded at their upper and lower ends to the inner surface of the drum, and each of the chambers is provided with end closure plates 48 which are spaced from the drum ends, as shown in Figs. 3 and 4.

The lower end portion of the wall of each chamber 47 is formed by an upright plate 50 extending longitudinally of the drum 10 between the end closure plates 48. The lower edge of each plate 50 is seam welded to the drum 10, and a series of longitudinally spaced openings are provided through the plate to accommodate the bell-mouthed pipes 46. Each of the pipes 46 is circumferentially welded in a circular opening in a plate 51, so that when the pipe is positioned in its operating relationship with the nozzle 44, the plate 51 is in upright abutting relationship with the plate 50. The plates are attached in position by upper and lower bolts, 52 and 53 respectively. A longitudinally elongated stiffening bar 54 and an angle plate 55 are also attached to the plates 50 and 51 by the upper bolts 52. The angle plate 55 is supported by a bracket 56 which also supports the lower end portion of an upwardly inclined plate 57. The bracket 56, angle plate 55 and plate 57 are held in assembly by a bolt and clamp combination 58, with a series of such connections spaced longitudinally along the wall of the chambers 47. Each of the pipes 46 is supported at its discharge end by an internally threaded boss 60 and stud bolt 61 from the plate 57, with the plate 57 upwardly extended to a bolted connection 62 with brackets 63 which are also welded to the shell of the drum 10. Above the connection 62, a plate 64 extends upwardly to a bolted connection 65 with a depending plate 66 welded at its upper end with the shell of drum 10. The plate 64 is provided with a series of openings therein to accommodate vertically elongated inlet ducts 67 extending horizontally toward the interior of the drum 10 and ending in a flanged connection 68 with the tangential inlet 70 to a whirl chamber 71. In the arrangement shown, the number of ducts 67 and whirl chambers 71 corresponds with the number of nozzles 44, with each of the ducts 67 in general vertical alignment with a pipe 44. However, exact correspondence between the number of nozzles 44 and chambers 71 is not essential to a proper functioning of the desuperheater.

With the bolted connections between the plates defining the inner wall of the chambers 47, and with each of the brackets 56 and 63 formed in matching bolted sections, the internal parts of the drum can be readily disassembled and assembled for any necessary repair or maintenance work within the drum 10.

The whirl chambers 71 are of the general type shown in the Rowand et al. Patent No. 2,289,970 and are each formed with upper and lower portions of circular cross section, 72 and 73 respectively, with an intermediate connecting portion 74 of frusto-conical shape having a downwardly increasing cross-sectional area. The tangential inlet 70 for each chamber 71 opens into the frusto-conical portion 74, and through its flanged connection 68 with the duct 67 positions and supports each whirl chamber from the plate 64. Both the top and bottom of the whirl chambers are open for the upward discharge of steam and the downward discharge of water separated within the chambers 71.

As shown particularly in Fig. 5, the steam discharging from the upper end of the whirl chambers 71 passes into a cap member 75 which encloses the upper portion of the row of whirl chambers 71 on each side of the drum. The cap member consists of a depending flange 76 extending longitudinally of the drum 10 and having its lower edge 77 projecting below the top of the whirl chamber 71, while side plates 78 of generally trapezoidal shape extend downwardly in between each whirl chamber and at the ends of each row of whirl chambers 71 to a level corresponding to the edge 77 of the angle 76. The cap members 75 are supported by a plate 80 welded to the shell of drum 10 at the intersection of the shell and the plate 66, a support arm 81 bolted to each of the plates 78 and a bracket arm 82 bolted to the end of each plate 78 adjacent the angle member 76. The arm 82 is bolted at one end to a lug 83 which is attached to the plate 64.

Figure 6:
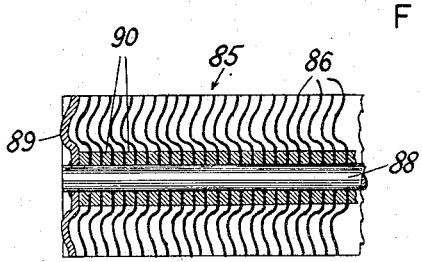
Fig. 6 is an enlarged section view taken on line 6—6 of Fig. 5.

An inverted, perforated pyramid 84 is mounted between the plate 80 and angle member 76, directly above each of the whirl chambers 71. In addition, a corrugated scrubber element 85 is mounted directly above each of the inverted pyramids 84. As shown in Fig. 6, the scrubber elements 85 are constructed with a series of parallel corrugated plate members 86 mounted between correspondingly corrugated end plates 87 on a through bolt 88 with spacer blocks 90 between each member 86. The blocks 90 are dimensioned so that the spacing between adjacent plates 86 is less than the depth of corrugation in each plate with this construction the plate surface of each plate overlaps the corrugation of the adjacent plate so that the sinuous flow of fluids through the scrubber must include plate contact with entrained heavy density matter in the fluid.

The steam discharged from each whirl chamber 71, pyramid 84 and scrubber 85 combination enters the upper portion of the drum, well above the normal water line therein and passes through a perforated dry pipe 91 toward the steam outlet nozzle of the drum. The dry pipe is of substantially U-shaped vertical section and is formed of a plate structure perforated with a multiplicity of small diameter holes. The upwardly extending arms of the U-shaped element are welded to the shell of the drum 10 while the midpoint of the U-shaped element is supported by a longitudinally spaced series of depending bolts 92 which are welded at their upper ends to the drum 10 and secured at their lower ends to the dry pipe.

In the operation of the desuperheater, some portion of the superheated steam passing through the conduit 13 is directed through the conduit 15 to the nozzle 16. The amount of steam passed through the desuperheater will depend upon the desired steam superheat temperature in the discharge conduit 18. When in service, the steam passing through the nozzles 44 educts water from the drum water space into the chambers 47 with the steam and water mixture passing tangentially at high velocity into the whirl chambers. The velocity of the steam passing through the nozzles 44 draws water through the orifices 45 to form the steam and water mixture which causes the steam to give up some heat and to evaporate some of the water. As a result of water evaporation, a greater quantity of steam will be discharged from the desuperheater than the quantity delivered thereto. With the conversion of superheated steam static pressure to velocity pressure in the eductor nozzles, and the pressure drop in passing steam and water through the whirl chambers, the steam pressure in the upper portion of the drum will be less than the pressure in the inlet compartment to the whirl chambers.

When the fluid conditioner of the present invention is used as a washer there will be little or no evaporation of the liquid recirculated through the eductors and the whirl chambers. However, the removal of solids from the incoming gaseous fluid by the wetting action of the liquid mixed therewith and subsequently separated therefrom will necessitate the removal of the solids from the washing liquid. As hereinbefore described solid and liquid separation can be accomplished in an external filter.

While in accordance with the provisions of the statutes I have illustrated and described herein the best form of the invention now known to me, those skilled in the art will understand that changes may be made in the form of the apparatus disclosed without departing from the spirit of the invention covered by my claims, and that certain features of the invention may sometimes be used to advantage without a corresponding use of other features.

I claim:

1. In combination, a pressure vessel, means for maintaining a body of liquid having a liquid level within said vessel, eductor means positioned below said liquid level for mixing a gaseous fluid with said liquid, and means for separating the liquid from the gaseous fluid within said vessel including a whirl chamber having a tangential inlet directly connected with said eductor means and top and bottom outlet openings, a perforated inverted pyramid disposed above said whirl chamber, and a perforated dry pipe disposed in the upper portion of said vessel and in communication with a gaseous fluid outlet nozzle from said vessel.

2. In combination, a pressure vessel, means for maintaining a body of liquid having a liquid level within said vessel, eductor means positioned below said liquid level for mixing a gaseous fluid with said liquid, and means for separating the liquid from the gaseous fluid including a whirl chamber having a tangential inlet directly connected with said eductor means and top and bottom outlet openings, a perforated inverted pyramid disposed above said whirl chamber, a scrubber associated with and in the path of gaseous fluid leaving said whirl chamber and pyramid, and a perforated dry pipe associated with the gaseous fluid outlet from said vessel.

3. In combination, a closed vessel, inlet and outlet connections to said vessel for a first fluid, means for maintaining a body of said fluid within said vessel, an inlet and an outlet connection to said vessel for a second fluid, said second fluid having a density less than said first fluid, walls forming channels along the sides of said vessel, means for mixing said fluids within said vessel including a tapering duct for said second fluid positioned beneath the level of said first fluid within said vessel, a plurality of spaced nozzles each opening from said duct into one of said channels, each of said nozzles positioned below said first fluid level and surrounded by an annular opening to said body of fluid, and fluid separating means positioned at least partially above said body of fluid and in communication with said channels.

4. In a gaseous fluid conditioner, a pressure confining drum having a gas outlet from its upper portion, means for maintaining a liquid level in said drum intermediate the vertical height thereof, a gas and liquid separator positioned in said drum and having a gas discharge outlet above said liquid level and a liquid discharge outlet below said level, conduit means in communication at its lower portion with the liquid space of the drum and in pressure tight connection with the inlet of said separator, and eductor means associated with said conduit means receiving high pressure gas and discharging gas and liquid through said conduit into said separator.

5. In a steam and water drum, inlet and outlet nozzle connections for water in the lower portion of said drum, means for maintaining a substantially constant water level within said drum, a steam inlet connection to said drum, a steam distributing manifold disposed beneath the level of said water within said drum, plates separating a side portion of said drum from said water, means defining an orifice in said plates, said orifice positioned beneath said water level, a steam outlet nozzle from said manifold projecting into said orifice and defining an annular opening therebetween, said nozzle and annular opening cooperating to mix steam and water and to discharge said mixture upwardly through said drum side portion, means for separating water and steam in the upper portion of said vessel, and a drum outlet nozzle for dry steam positioned above said water level.

6. In a steam conditioner, a horizontally extending drum having a steam outlet in the upper portion thereof, means for maintaining a water level in said drum intermediate the vertical height thereof, a steam supply manifold extending longitudinally within the drum adjacent the bottom thereof, a plurality of longitudinally spaced water circulating means, said means comprising steam discharge nozzles connected to said supply manifold having their discharge ends directed into upwardly curved cylindrical section mixing tubes, said tubes being open to the water space of the drum adjacent the discharge ends of said nozzles.

7. In apparatus for desuperheating steam, the combination comprising a drum, a source of superheated steam, a source of water, means for mixing steam and water including a steam discharge nozzle connected with said steam source, a member overlappingly encircling the discharge end of said steam nozzle to define an annular opening therebetween submerged in a body of said water, a chamber separated from said body of water and arranged to receive said mixture of water and steam, means for separating water from said mixture including a connection for the return of separated water to said body of water, and means for maintaining a substantially constant level of said body of water.

8. In apparatus for desuperheating steam, the combination comprising a source of superheated steam, a source of desuperheating water, means for mixing steam and water including a steam discharge nozzle connected with said steam source, a pipe having a bell mouthed end portion overlappingly encircling the discharged end of said steam nozzle to define an annular opening therebetween submerged in a body of said desuperheating water, a chamber separated from said body of water and arranged to receive a mixture of water and steam from said pipe, means for separating water from said water and steam mixture including a return connection for the return of separated water to said body of water, and means for maintaining a substantially constant level of said body of desuperheating water.

9. In apparatus for desuperheating steam, the combination comprising a source of superheated steam, a source of desuperheating water, means for mixing steam and water including a steam nozzle receiving said superheated steam, a pipe having a bell mounted end portion overlappingly encircling the discharge end of said steam nozzle to define an annular opening therebetween submerged in a body of water, a chamber separated from said body of water and arranged to receive a mixture of water and steam discharged from said pipe, and means for separating water from said steam and water mixture including a whirl chamber receiving a tangentially directed stream of said mixture from said chamber, said whirl chamber having a lower outlet submerged in said body of water for the discharge of water therefrom and an upper outlet above said body of water for the discharge of substantially dry steam therefrom.

10. In apparatus for desuperheating steam, the combination comprising a drum, a source of superheated steam, a source of water, means for maintaining a substantially constant water level within said drum, means for mixing steam and water within said drum including a plurality of steam nozzles substantially equally spaced below said water level, means for delivering superheated steam to said steam nozzles, a pipe having a diverging end portion overlappingly encircling the discharge end of each of said steam nozzles to define an annular opening therebetween submerged in said water, a chamber separated from the water in said drum and arranged to receive a mixture of water and steam discharged from said pipe, and means for separating water from said mixture including a plurality of whirl chambers each receiving a tangentially directed stream of said mixture from said chamber, each whirl chamber having a lower outlet below said water level for the discharge of water therefrom and an upper outlet above said water level for the discharge of substantially dry steam therefrom to a drum outlet steam nozzle.

PAUL M. BRISTER.

References Cited in the file of this patent

UNITED STATES PATENTS

| Number | Name | Date |
|---|---|---|
| 1,803,381 | Davy | May 5, 1931 |
| 1,808,088 | Urquhart | June 2, 1931 |
| 2,012,315 | McIntire | Aug. 27, 1935 |
| 2,434,663 | Letvin | Jan. 20, 1948 |
| 2,434,677 | Stillman | Jan. 20, 1948 |